(12) United States Patent
Lu et al.

(10) Patent No.: US 10,936,645 B2
(45) Date of Patent: Mar. 2, 2021

(54) METHOD AND APPARATUS FOR GENERATING TO-BE-PLAYED MULTIMEDIA CONTENT

(71) Applicant: Baidu Online Network Technology (Beijing) Co., Ltd., Beijing (CN)

(72) Inventors: Guang Lu, Beijing (CN); Wenbo Zhang, Beijing (CN); Xiajun Luo, Beijing (CN); Shiquan Ye, Beijing (CN); Xiangjie Yin, Beijing (CN); Ran Zhao, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 391 days.

(21) Appl. No.: 15/858,147

(22) Filed: Dec. 29, 2017

(65) Prior Publication Data
US 2019/0147059 A1 May 16, 2019

(30) Foreign Application Priority Data
Nov. 14, 2017 (CN) .......................... 201711123505.7

(51) Int. Cl.
| | | |
|---|---|---|
| *G06F 16/00* | (2019.01) | |
| *G06F 16/435* | (2019.01) | |
| *G06F 16/48* | (2019.01) | |
| *G06F 16/438* | (2019.01) | |

(52) U.S. Cl.
CPC ........ *G06F 16/435* (2019.01); *G06F 16/4387* (2019.01); *G06F 16/48* (2019.01)

(58) Field of Classification Search
CPC ..... G06F 16/435; G06F 16/4387; G06F 16/48
USPC ......................................................... 707/722
See application file for complete search history.

(56) References Cited

U.S. PATENT DOCUMENTS

| | | | | |
|---|---|---|---|---|
| 9,489,454 | B1 * | 11/2016 | Lewis ..................... | G06F 16/40 |
| 9,578,374 | B1 * | 2/2017 | Whitten ............. | H04N 21/4622 |
| 9,966,112 | B1 * | 5/2018 | Kulkarni .......... | H04N 21/23418 |
| 2008/0301173 | A1 * | 12/2008 | Ryu ....................... | G06F 16/634 |
| 2010/0257203 | A1 * | 10/2010 | Sun ...................... | G06F 16/4387 |
| | | | | 707/780 |

(Continued)

*Primary Examiner* — Thanh-Ha Dang
(74) *Attorney, Agent, or Firm* — Knobbe, Martens, Olson & Bear, LLP

(57) ABSTRACT

The embodiments of the disclosure disclose a method and apparatus for generating to-be-played multimedia content. An embodiment of the method includes: receiving a third-party multimedia playlist, the third-party multimedia playlist being from a third-party multimedia playing platform; analyzing the third-party multimedia playlist to obtain identifier information of multimedia contents in the third-party multimedia playlist, the identifier information including name information of the multimedia content and name information of the leading author; determining to-be-played multimedia content matching the multimedia contents in the third-party multimedia playlist from a multimedia content database based on the identifier information of the multimedia contents in the third-party multimedia playlist to generate a to-be-played multimedia content list; and sending the to-be-played multimedia content list to a terminal playing device. The embodiment may integrate multimedia resources from different third-party multimedia platforms, and improve the consistency in playing multimedia resources.

15 Claims, 6 Drawing Sheets

(56) References Cited

U.S. PATENT DOCUMENTS

| | | | |
|---|---|---|---|
| 2012/0066343 A1* | 3/2012 | Van Vleck | G06F 16/48 709/217 |
| 2012/0303713 A1* | 11/2012 | Harbick | G06F 16/24578 709/204 |
| 2013/0198268 A1* | 8/2013 | Hyman | H04L 65/4092 709/203 |
| 2014/0258292 A1* | 9/2014 | Thramann | G06F 16/48 707/736 |
| 2015/0039620 A1* | 2/2015 | Ning | G06F 16/4387 707/740 |
| 2018/0189391 A1* | 7/2018 | Ip | G06F 16/635 |
| 2018/0285896 A1* | 10/2018 | Deluca | G06Q 30/0201 |
| 2019/0026817 A1* | 1/2019 | Helferty | G06Q 30/0633 |
| 2019/0348078 A1* | 11/2019 | Kulkarni | H04N 21/23418 |
| 2019/0354342 A1* | 11/2019 | Tao | G06K 7/00 |

\* cited by examiner

METHOD AND APPARATUS FOR GENERATING TO-BE-PLAYED MULTIMEDIA CONTENT

CROSS-REFERENCE TO RELATED APPLICATIONS

This application is related to and claims priority from Chinese Patent Application No. 201711123505.7, filed with the State Intellectual Property Office (SIPO) of the People's Republic of China on Nov. 14, 2017, the entire disclosure of which is hereby incorporated by reference.

TECHNICAL FIELD

Embodiments of the disclosure relate to the field of computer technology, specifically to the field of Internet technology, and more specifically to a method and apparatus for generating to-be-played multimedia content.

BACKGROUND

An existing multimedia platform may generate a playlist of all multimedia contents of the platform by interacting with a user.

For example, a user may get access to a multimedia platform, and generate a multimedia content playlist by inputting certain search conditions, where multimedia contents in the multimedia content playlist are all provided by the multimedia platform. This way, the user may implement corresponding operations, such as playing and pausing, of the multimedia contents in the multimedia content playlist.

SUMMARY

An object of an embodiment of the disclosure is to provide a method and apparatus for generating to-be-played multimedia content.

In a first aspect, an embodiment of the disclosure provides a method for generating to-be-played multimedia content, including: receiving a third-party multimedia playlist, the third-party multimedia playlist being from a third-party multimedia playing platform; analyzing the third-party multimedia playlist to obtain identifier information of multimedia contents in the third-party multimedia playlist; determining to-be-played multimedia content matching the multimedia contents in the third-party multimedia playlist from a multimedia content database based on the identifier information of the multimedia contents in the third-party multimedia playlist to generate a to-be-played multimedia content list; and sending the to-be-played multimedia content list to a terminal playing device.

In some embodiments, the determining to-be-played multimedia content matching the multimedia contents in the third-party multimedia playlist from a multimedia content database based on the identifier information of the multimedia contents in the third-party multimedia playlist to generate a to-be-played multimedia content list includes: determining to-be-played multimedia content identical to the multimedia contents in the third-party multimedia playlist from the multimedia content database based on the identifier information of the multimedia contents in the third-party multimedia playlist.

In some embodiments, the to-be-played multimedia content list further includes identifier information of the third-party multimedia playing platform; and the sending the to-be-played multimedia content list to a terminal playing device includes: sending the to-be-played multimedia content list to the terminal playing device, to enable the terminal playing device to play, before playing the to-be-played multimedia content in the to-be-played multimedia content list, the identifier information of the third-party multimedia playing platform.

In some embodiments, the determining to-be-played multimedia content matching the multimedia contents in the third-party multimedia playlist from a multimedia content database based on the identifier information of the multimedia contents in the third-party multimedia playlist to generate a to-be-played multimedia content list includes: determining to-be-played multimedia content including a similarity to the multimedia contents in the third-party multimedia playlist within a preset similarity threshold range from the multimedia content database based on the identifier information of the multimedia contents in the third-party multimedia playlist.

In some embodiments, the similarity between the to-be-played multimedia content in the multimedia content database and the multimedia contents in the third-party multimedia playlist are determined based on at least one of following items: based on a number of co-occurrences of the to-be-played multimedia content in the multimedia content database and the multimedia contents in the third-party multimedia playlist in a historical playlist; based on a similarity between the to-be-played multimedia content in the multimedia content database and a performance style tag of the multimedia contents in the third-party multimedia playlist; and based on a degree of association between the to-be-played multimedia content in the multimedia content database and a leading author tag of the multimedia contents in the third-party multimedia playlist.

In some embodiments, after the determining to-be-played multimedia content matching the multimedia contents in the third-party multimedia playlist from a multimedia content database based on the identifier information of the multimedia contents in the third-party multimedia playlist to generate a to-be-played multimedia content list, the method further includes: filtering and/or ordering the to-be-played multimedia content in the to-be-played multimedia content list based on a historical operation behavior of the user.

In a second aspect, an embodiment of the disclosure further provides an apparatus for generating to-be-played multimedia content, including: a receiving unit configured for receiving a third-party multimedia playlist, the third-party multimedia playlist being from a third-party multimedia playing platform; an analysis unit configured for analyzing the third-party multimedia playlist to obtain identifier information of multimedia contents in the third-party multimedia playlist; a determination unit configured for determining to-be-played multimedia content matching the multimedia contents in the third-party multimedia playlist from a multimedia content database based on the identifier information of the multimedia contents in the third-party multimedia playlist to generate a to-be-played multimedia content list; and a sending unit configured for sending the to-be-played multimedia content list to a terminal playing device.

In some embodiments, the determination unit is further configured for: determining to-be-played multimedia content identical to the multimedia contents in the third-party multimedia playlist from the multimedia content database based on the identifier information of the multimedia contents in the third-party multimedia playlist.

In some embodiments, the to-be-played multimedia content list further includes identifier information of the third-party multimedia playing platform; and the sending unit is further configured for: sending the to-be-played multimedia content list to the terminal playing device, to enable the terminal playing device to play, before playing the to-be-played multimedia content in the to-be-played multimedia content list, the identifier information of the third-party multimedia playing platform.

In some embodiments, the determination unit is further configured for: determining to-be-played multimedia content including a similarity to the multimedia contents in the third-party multimedia playlist within a preset similarity threshold range from the multimedia content database based on the identifier information of the multimedia contents in the third-party multimedia playlist.

In some embodiments, the similarity between the to-be-played multimedia content in the multimedia content database and the multimedia contents in the third-party multimedia playlist are determined based on at least one of following items: based on a number of co-occurrences of the to-be-played multimedia content in the multimedia content database and the multimedia contents in the third-party multimedia playlist in a historical playlist; based on a similarity between the to-be-played multimedia content in the multimedia content database and a performance style tag of the multimedia contents in the third-party multimedia playlist; and based on a degree of association between the to-be-played multimedia content in the multimedia content database and a leading author tag of the multimedia contents in the third-party multimedia playlist.

In some embodiments, the receiving unit is further configured for: receiving the third-party multimedia playlist sent by a user; and the apparatus for generating to-be-played multimedia content according to the disclosure further includes an updating unit, which is configured for: filtering and/or ordering, after the determination unit determines to-be-played multimedia content matching the multimedia contents in the third-party multimedia playlist from a multimedia content database based on the identifier information of the multimedia contents in the third-party multimedia playlist to generate a to-be-played multimedia content list, the to-be-played multimedia content in the to-be-played multimedia content list based on a historical operation behavior of the user.

In a third aspect, an embodiment of the disclosure further provides an electronic device, including: one or more processors; and a storage device for storing one or more programs; where the one or more programs, when executed by the one or more processors, enable the one or more processors to implement the method for generating to-be-played multimedia content according to any one of the embodiments.

In a fourth aspect, an embodiment of the disclosure further provides a computer readable storage medium storing computer programs, where the programs, when executed by a processor, enable to implement the method for generating to-be-played multimedia content according to any one of the embodiments.

A method and apparatus for generating to-be-played multimedia content provided in an embodiment of the disclosure receive and analyze a third-party multimedia playlist sent by a user, determine to-be-played multimedia content matching the multimedia contents in the third-party multimedia playlist from a multimedia content database to generate a to-be-played multimedia content list, and send the to-be-played multimedia content list to a terminal playing device. The embodiment may integrate multimedia resources from different third-party multimedia platforms, contribute to reducing network resource occupancy, and improve the consistency in playing multimedia resources.

In some embodiments, by pushing multimedia contents to a user based on a historical operation behaviour of the user, more targetedly pushing multimedia contents may be realized.

BRIEF DESCRIPTION OF THE DRAWINGS

By reading and referring to the detailed description of non-limiting embodiments provided in the accompanying drawings, other features, objects and advantages of the disclosure will become clearer.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
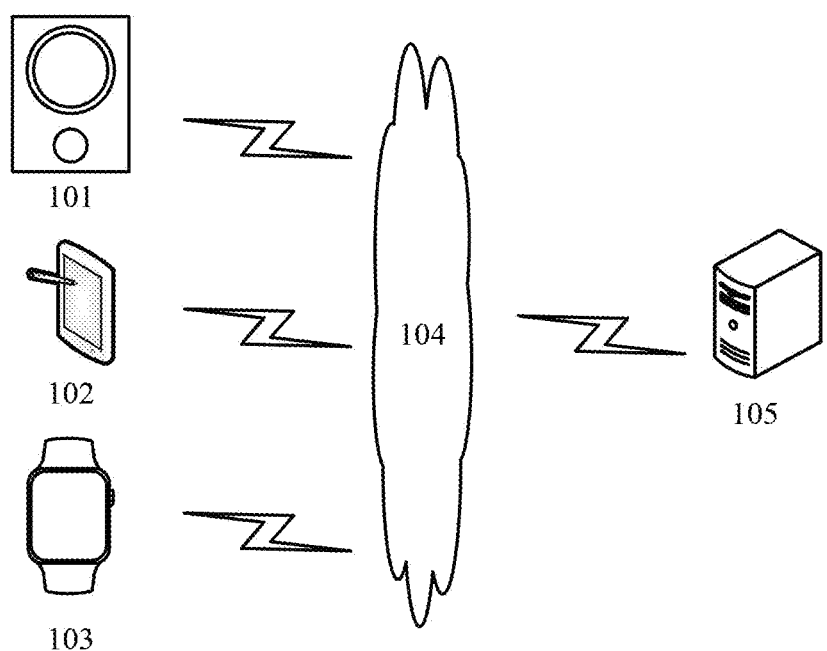
FIG. 1 is an architectural diagram of an illustrative system in which the present application may be implemented.

FIG. 1 shows an illustrative architecture of a system 100 which may be used by a method for generating to-be-played multimedia content or an apparatus for generating to-be-played multimedia content according to the embodiments of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various communication client applications, such as multimedia playing applications, web browser applications, search applications, instant messaging tools, and social platform software may be installed on the terminal devices 101, 102 and 103.

The terminal devices 101, 102 and 103 may be various electronic devices including functions of human-computer interaction and multimedia playing, including but not limited to, smart phones, smart multimedia playing devices, smart wearable devices, tablet computers, laptop computers and desktop computers.

The server 105 may be a server providing various services, for example, a back-end multimedia server providing support for a multimedia playing request sent by the terminal devices 101, 102 or 103. The back-end multimedia server may perform a corresponding processing on data, such as an analysis on the received multimedia playing request, and return a processing result (for example, a generated to-be-played multimedia content list) to the terminal devices 101, 102 or 103.

It should be noted that the method for generating to-be-played multimedia content according to the embodiments of the present application is generally executed by the server 105. Accordingly, an apparatus for generating to-be-played multimedia content is generally installed on the server 105.

It should be understood that the numbers of terminal devices, networks and servers in FIG. 1 are only indicative. Depending on the actual needs, any numbers of terminal devices, networks and servers may exist.

Figure 2:
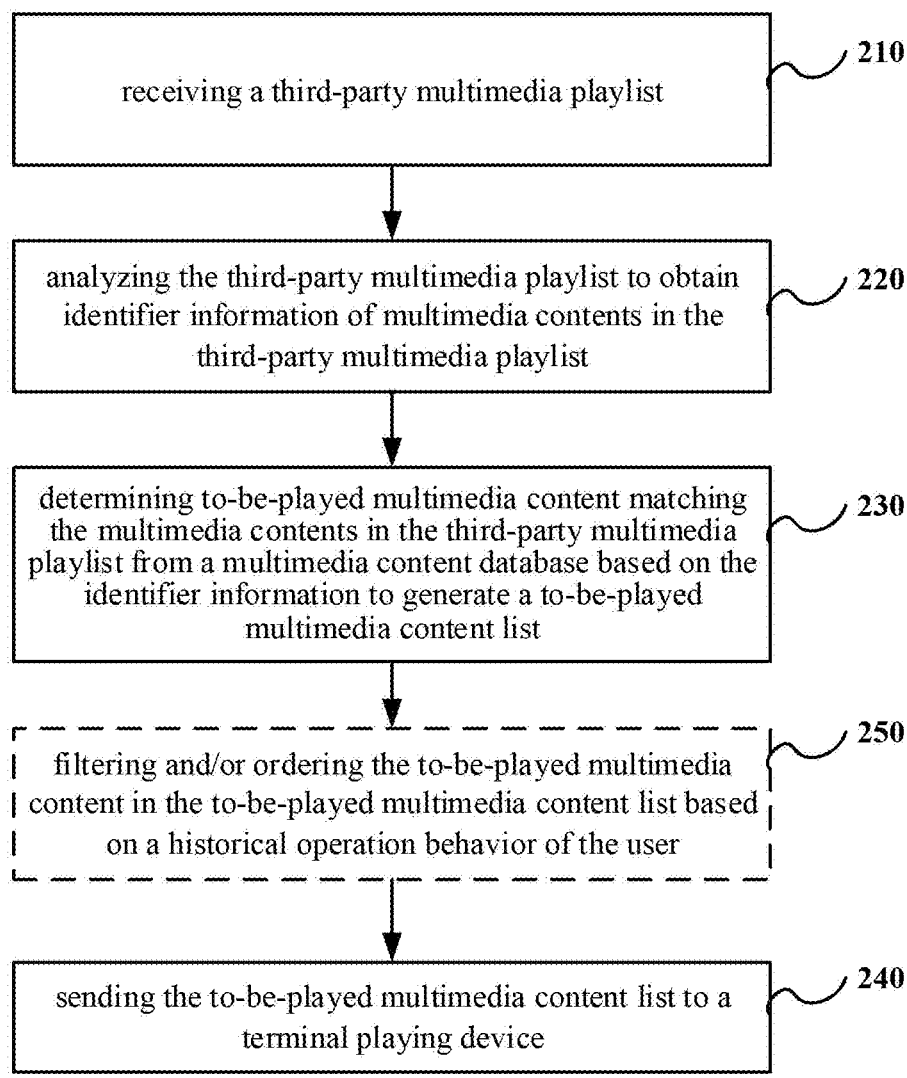
FIG. 2 is a schematic flowchart of a first embodiment of a method for generating to-be-played multimedia content according to the disclosure.

Further referring to FIG. 2, a process 200 of an embodiment of a method for generating to-be-played multimedia content according to the disclosure is shown. The method for generating to-be-played multimedia content includes the following steps:

Step 210, receiving a third-party multimedia playlist, the third-party multimedia playlist being from a third-party multimedia playing platform.

In this embodiment, an electronic device (e.g., a server shown in FIG. 1) on which the method for generating to-be-played multimedia content runs may receive a third-party multimedia playlist from a terminal device used by a user through wired connection or wireless connection. It should be noted that the wireless connection may include, but is not limited to, 3G/4G connection, WiFi connection, bluetooth connection, WiMAX connection, Zigbee connection, UWB (ultra wideband) connection, and other wireless connections that are known at present or will be developed in the future.

In some other application scenarios, a terminal device may receive a multimedia playlist from a third-party multimedia playing platform and sent by a electronic device in communication connection with the terminal device.

Then, the terminal device may send a locally stored third-party multimedia list or a third-party multimedia list downloaded to a local address to the electronic device on which the method for generating to-be-played multimedia content according to this embodiment is applied (e.g., the server 105 shown in FIG. 1).

It is understandable that the terminal device may send the third-party multimedia lists from a plurality of third-party multimedia platforms to the electronic device on which the method for generating to-be-played multimedia content according to this embodiment is applied, so that the electronic device receives these third-party multimedia lists.

Step 220, analyzing the third-party multimedia playlist to obtain identifier information of multimedia contents in the third-party multimedia playlist. Here, the identifier information, e.g., may include name information of the multimedia content and name information of the leading author.

Here, the third-party multimedia playlist may correspondingly store information in the form of a list. By analyzing the third-party multimedia playlist, the identifier information, such as name information and performer information, of the multimedia contents may be extracted from the list.

For example, the list may correspondingly store the information, such as a serial number of each multimedia content in the list, and a name, time duration, a performer's name and a source (for example, an album and times of works of the multimedia contents) of the multimedia contents. After the third-party multimedia list is analyzed, the identifier information therein may be extracted.

Step 230, determining to-be-played multimedia content matching the multimedia contents in the third-party multimedia playlist from a multimedia content database based on the identifier information of the multimedia contents in the third-party multimedia playlist to generate a to-be-played multimedia content list.

Here, the multimedia content database may be a database storing large amounts of multimedia contents and maintained by the electronic device on which the method for generating to-be-played multimedia content according to this embodiment is applied. When a user sends the electronic device a request associated with the multimedia content stored thereon, the electronic device may generate a corresponding instruction based on the request, and get access to the multimedia content database to execute relevant operations. The to-be-played multimedia content matching the multimedia contents in the third-party multimedia playlist may be understood as the multimedia content strongly associated with the multimedia contents in the third-party multimedia playlist in the multimedia content database.

In some application scenarios, for example, multimedia content matching the multimedia contents in the third-party multimedia playlist may be determined from the multimedia content database using a pre-trained matching multimedia content determination model.

In some application scenarios, a matching degree between multimedia content in a multimedia content database and a multimedia content in the third-party multimedia playlist may be described by some quantification algorithms. In these application scenarios, in a multimedia content database, multimedia content including a degree of matching with the multimedia content third-party multimedia playlist greater than a preset threshold may be used as the multimedia content matching therewith.

Alternatively, in some other application scenarios, a matching degree between multimedia content in a multimedia content database and a multimedia content in a third-party multimedia playlist may be qualitatively described. For example, a matching degree between multimedia content in a multimedia content database and a multimedia content in a third-party multimedia playlist is reflected by a word, such as strong, moderate or weak. In these application scenarios, for example, multimedia content including a degree of matching with a multimedia content in a third-party multimedia playlist being a preset degree (e.g., "strong" degree) may be used as the multimedia content matching therewith.

Step 240, sending the to-be-played multimedia content list to a terminal playing device.

The electronic device on which the method for generating to-be-played multimedia content according to this embodiment is applied may send the generated to-be-played multimedia content list to a terminal playing device (e.g., a loudspeaker box), so that the loudspeaker box plays multimedia contents contained in the list.

The method for generating to-be-played multimedia content according to this embodiment receives and analyzes the third-party multimedia playlist sent by a user, and determines to-be-played multimedia content matching the multimedia contents in the third-party multimedia playlist from a multimedia content database, thereby generating a to-be-played multimedia content list and sending the to-be-played multimedia content list to a terminal playing device. The method may integrate multimedia resources from different third-party multimedia platforms, contributes to reducing network resource occupancy, and improves the consistency in playing multimedia resources. In addition, the multimedia contents contained in the generated to-be-played multimedia list match the multimedia contents in the third-party multimedia playlist, so that the multimedia contents in the generated to-be-played multimedia content list comply with the users' preferences, and contribute to improving the user experience.

In some optional modes of implementing this embodiment, the receiving a third-party multimedia playlist in the step 210 of this embodiment may further include: receiving the third-party multimedia playlist sent by a user.

In some application scenarios of these optional modes of implementing this embodiment, the terminal device used by a user may be installed with at least one third-party multimedia playing platform. Each third-party multimedia playing platform may store a preset multimedia playlist. In these application scenarios, a user may get access to the third-party multimedia playing platform, and export the preset multimedia playlist. For example, the multimedia playlist is exported to an instant messaging application on the terminal device, or the multimedia playlist is stored as a file format identifiable by the terminal device.

In some optional modes of implementing this embodiment, after the determining to-be-played multimedia content matching the multimedia contents in the third-party multimedia playlist from a multimedia content database based on the identifier information of the multimedia contents in the third-party multimedia playlist to generate a to-be-played multimedia content list in the step 230, the method for generating to-be-played multimedia content according to this embodiment may further include:

Step 250, filtering and/or ordering the to-be-played multimedia content in the to-be-played multimedia content list based on a historical operation behavior of the user.

For example, in some application scenarios, a user has executed an operation characterizing positive emotion (e.g., an operation of "like") of a multimedia content in a third-party multimedia list uploaded to the electronic device. Then the ranking of the multimedia content in the to-be-played multimedia content list may be moved up.

Alternatively, in some application scenarios, a user has executed an operation characterizing negative emotion (e.g., an operation of "dislike") of a multimedia content in a third-party multimedia list uploaded to the electronic device. Then the ranking of the multimedia content in the to-be-played multimedia content list may be moved down.

Figure 3:
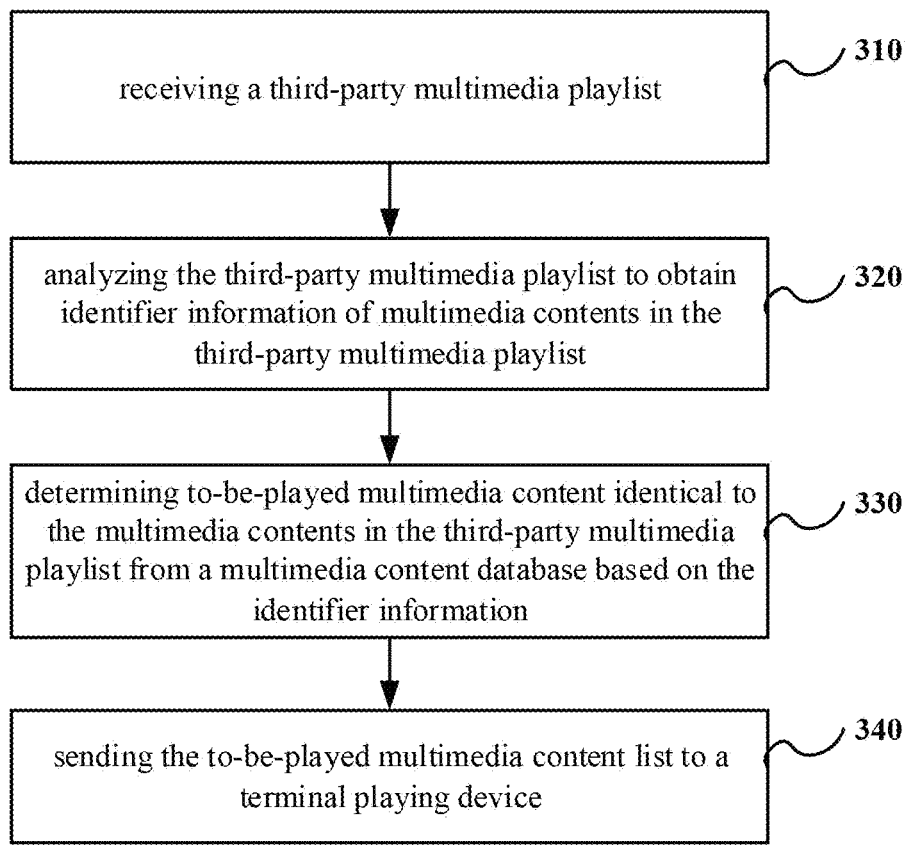
FIG. 3 is a schematic flowchart of a second embodiment of a method for generating to-be-played multimedia content according to the disclosure.

Further referring to FIG. 3, a process 300 of another embodiment of a method for generating to-be-played multimedia content is shown. The process 300 of the method for generating to-be-played multimedia content includes the following steps:

Step 310, receiving a third-party multimedia playlist, the third-party multimedia playlist being from a third-party multimedia playing platform.

Step 320, analyzing the third-party multimedia playlist to obtain identifier information of multimedia contents in the third-party multimedia playlist, where the identifier information includes name information of the multimedia content and name information of the leading author.

The modes of executing the step 310 and the step 320 are similar to the modes of executing the step 210 and the step 220 in the embodiment shown in FIG. 2, and are not repeated any more here.

Step 330, determining to-be-played multimedia content identical to the multimedia contents in the third-party multimedia playlist from a multimedia content database based on the identifier information of the multimedia contents in the third-party multimedia playlist.

Different from the embodiment shown in FIG. 2, in this embodiment, to-be-played multimedia content identical to the multimedia contents in the third-party multimedia playlist may be determined from a multimedia content database stored in the electronic device on which the method for generating to-be-played multimedia content according to this embodiment is applied or from a multimedia content database in communication connection with the electronic device.

In some application scenarios, if in the step 310, the electronic device receives a multimedia list A sent by a user using a terminal from a third-party multimedia platform A, where the multimedia list A contains multimedia contents a1, a2 . . . and an, and receives a multimedia list B sent by the user from a third-party multimedia platform B, where the multimedia list B contains multimedia contents b1, b2 . . . and bm. After processing in the step 330, to-be-matched multimedia contents, e.g., a1, a2 . . . and an, and b1, b2 . . . and bm, identical to the multimedia contents in the multimedia list A and in the multimedia list B may be determined from the multimedia content database.

Step 340, sending the to-be-played multimedia content list to a terminal playing device.

In some optional modes of implementing this embodiment, the to-be-played multimedia content list generated in the step 330 may further include the identifier information of the third-party multimedia playing platform. For example, the multimedia contents a1, a2 . . . and an from the third-party multimedia playing platform A may include the identifier information of the multimedia playing platform. A, for example, the application name of the multimedia playing platform A.

In these optional modes of implementing this embodiment, the step 340 may further include:

Step 341, sending the to-be-played multimedia content list to the terminal playing device, to enable the terminal playing device to play, before playing the to-be-played multimedia content in the to-be-played multimedia content list, the identifier information of the third-party multimedia playing platform.

For example, before the multimedia contents a1, a2 . . . and an are played, "the following contents are from the multimedia application A" or similar voice may be played to prompt the user of the source of the following multimedia contents.

The method for generating to-be-played multimedia content according to this embodiment enables the generated to-be-played multimedia content list to include multimedia contents from a third-party multimedia playlist, so that the method for generating to-be-played multimedia content according to this embodiment may generate a to-be-played multimedia content list containing multimedia contents from different third-party multimedia playing platforms, avoids the problem that a user can only obtain corresponding multimedia contents by respectively getting access to each third-party multimedia platform, contributes to reducing occupancy of network communication resources, and improves the efficiency in obtaining multimedia contents.

Figure 4:
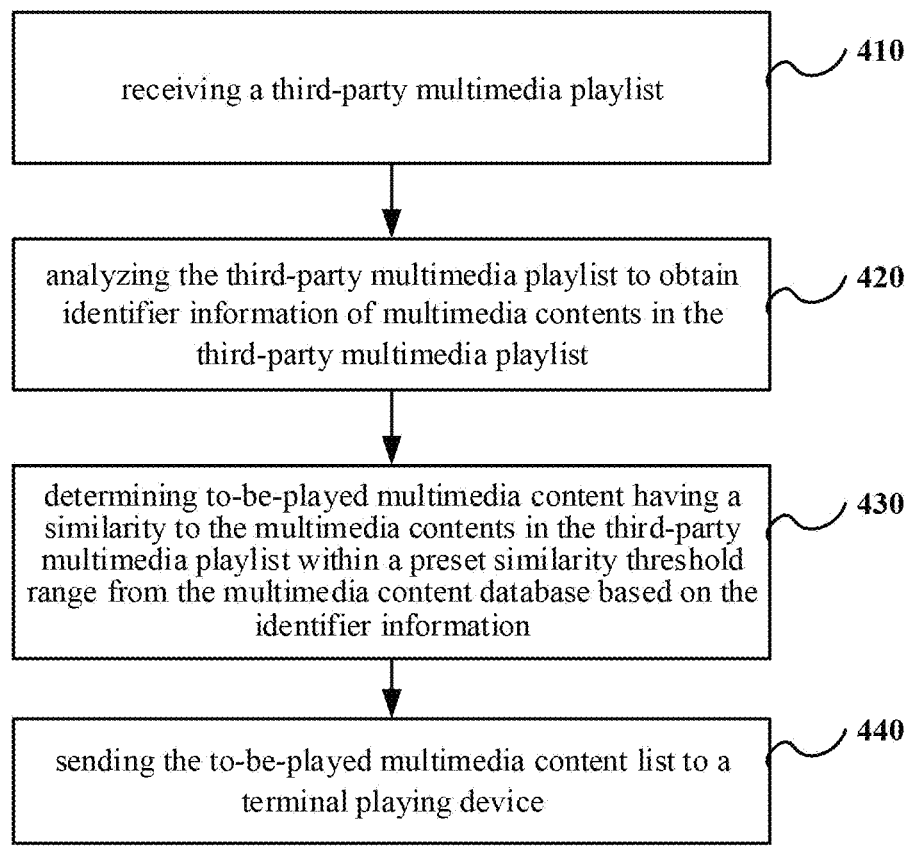
FIG. 4 is a schematic flowchart of a third embodiment of a method for generating to-be-played multimedia content according to the disclosure.

Further referring to FIG. 4, a process 400 of a third embodiment of a method for generating to-be-played multimedia content is shown. The process 400 of the method for generating to-be-played multimedia content includes the following steps:

Step 410, receiving a third-party multimedia playlist, the third-party multimedia playlist being from a third-party multimedia playing platform.

Step 420, analyzing the third-party multimedia playlist to obtain identifier information of multimedia contents in the third-party multimedia playlist, where the identifier information includes name information of the multimedia content and name information of the leading author.

The modes of executing the step 410 and the step 420 are similar to the modes of executing the step 210 and the step 220 in the embodiment shown in FIG. 2, and are not repeated any more here.

Step 430, determining to-be-played multimedia content including a similarity to the multimedia contents in the third-party multimedia playlist within a preset similarity threshold range from the multimedia content database based on the identifier information of the multimedia contents in the third-party multimedia playlist.

In some optional modes of implementing this embodiment, the similarity between the to-be-played multimedia content in the multimedia content database and the multimedia contents in the third-party multimedia playlist in the step 430 may be determined based on at least one of following items:

based on a number of co-occurrences of the to-be-played multimedia content in the multimedia content database and the multimedia contents in the third-party multimedia playlist in a historical playlist. For example, the number of occurrences of the multimedia content a1 in the multimedia playlist A from the third-party multimedia platform A and the multimedia content c1 in a multimedia content database in a preset multimedia playlist database in a given multimedia playlist is d1, while the number of occurrences of the multimedia content a1 and multimedia content c2 in a multimedia content database in a preset multimedia playlist database in a given multimedia playlist is d2. If d1>d2, then it may be considered that the similarity between the multimedia content c1 and the multimedia content a1 is higher than the similarity between the multimedia content c2 and the multimedia content a1.

based on a similarity between the to-be-played multimedia content in the multimedia content database and a performance style tag of the multimedia contents in the third-party multimedia playlist. For example, in some application scenarios, the multimedia contents in the third-party multimedia playlist respectively have at least one preset style tag, and the multimedia contents in the multimedia content database also respectively have at least one preset style tag. In these application scenarios, if a multimedia content in the third-party multimedia list and a multimedia content in the multimedia content database have an identical style tag, then it may be considered that they have a high similarity. It could be understood that if the multimedia contents respectively have a plurality of style tags, then the more identical style tags the two multimedia contents share, the higher the similarity between them is.

based on a degree of association between the to-be-played multimedia content in the multimedia content database and a leading author tag of the multimedia contents in the third-party multimedia playlist. For example, in some application scenarios, the multimedia contents in third-party multimedia playlists respectively have a leading author tag.

For example, if the multimedia content is a song, then the leading author tag may indicate a singer, a lyricist, a composer or the like of the song. Or, if the multimedia content is a movie, then the leading author tag may indicate a leading actor, a director, a scriptwriter or the like of the movie. In these application scenarios, if a multimedia content in the third-party multimedia list and a multimedia content in the multimedia content database have an identical leading author tag, then it may be considered that they have a high similarity.

It could be understood that if the similarity between the to-be-played multimedia content in the multimedia content database and the multimedia contents in the third-party multimedia playlist is determined using two or more of the above, then the similarity determined based on similarity determination algorithms may be weighted to determine the final similarity between them.

Step 440, sending the to-be-played multimedia content list to the terminal playing device.

The method for generating to-be-played multimedia content according to this embodiment determines to-be-played multimedia content including a similarity to the multimedia contents in the third-party multimedia playlist within a preset similarity threshold range in the multimedia content database, and may adjust the similarity between the to-be-played multimedia contents in the finally generated to-be-played multimedia content list and the multimedia contents in the third-party multimedia playlist by setting a preset similarity threshold range. For example, to-be-played multimedia content identical to the multimedia content in the third-party multimedia playlist, to-be-played multimedia content including a high similarity to the multimedia content in the third-party multimedia playlist, to-be-played multimedia content completely different from the multimedia content in the third-party multimedia playlist or the like may be generated. The method saves the time spent by a user in actively obtaining multimedia contents one by one, saves network resources, and improves the efficiency and accuracy in pushing multimedia contents.

Figure 5:
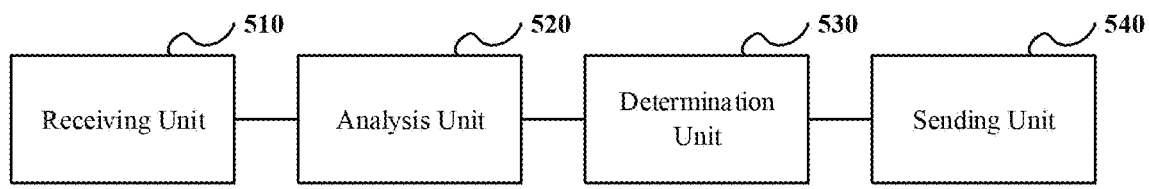
FIG. 5 is a structural schematic diagram of an embodiment of an apparatus for generating to-be-played multimedia content according to the disclosure.

Further referring to FIG. 5, as implementation of the methods shown in the figures, the disclosure provides an embodiment of an apparatus for generating to-be-played multimedia content, the embodiment of the apparatus corresponds to the embodiment of the method shown in FIG. 2, and the apparatus may be specifically applied in a variety of electronic devices.

As shown in FIG. 5, an apparatus 500 for generating to-be-played multimedia content according to this embodiment includes: a receiving unit 510, an analysis unit 520, a determination unit 530 and a sending unit 540.

The receiving unit 510 may be configured for receiving a third-party multimedia playlist, the third-party multimedia playlist being from a third-party multimedia playing platform.

The analysis unit 520 may be configured for analyzing the third-party multimedia playlist to obtain identifier information of multimedia contents in the third-party multimedia playlist, where the identifier information includes name information of the multimedia content and name information of the leading author.

The determination unit 530 may be configured for determining to-be-played multimedia content matching the multimedia contents in the third-party multimedia playlist from a multimedia content database based on the identifier information of the multimedia contents in the third-party multimedia playlist to generate a to-be-played multimedia content list.

The sending unit 540 may be configured for sending the to-be-played multimedia content list to a terminal playing device.

In some optional modes of implementing this embodiment, the determination unit 530 may be further configured for: determining to-be-played multimedia content identical to the multimedia contents in the third-party multimedia playlist from the multimedia content database based on the identifier information of the multimedia contents in the third-party multimedia playlist.

In some optional modes of implementing this embodiment, the to-be-played multimedia content list further includes identifier information of the third-party multimedia playing platform; and the sending unit 540 may be further configured for: sending the to-be-played multimedia content list to the terminal playing device, to enable the terminal playing device to play, before playing the to-be-played multimedia content in the to-be-played multimedia content list, the identifier information of the third-party multimedia playing platform.

In some optional modes of implementing this embodiment, the determination unit 530 may be further configured for: determining to-be-played multimedia content including a similarity to the multimedia contents in the third-party multimedia playlist within a preset similarity threshold range from the multimedia content database based on the identifier information of the multimedia contents in the third-party multimedia playlist.

In some optional modes of implementing this embodiment, the similarity between the to-be-played multimedia content in the multimedia content database and the multimedia contents in the third-party multimedia playlist are determined based on at least one of following items: based on a number of co-occurrences of the to-be-played multimedia content in the multimedia content database and the multimedia contents in the third-party multimedia playlist in a historical playlist; based on a similarity between the to-be-played multimedia content in the multimedia content database and a performance style tag of the multimedia contents in the third-party multimedia playlist; and based on a degree of association between leading author tags of the to-be-played multimedia content in the multimedia contents database and the multimedia content in the third-party multimedia playlist.

In some optional modes of implementing this embodiment, the receiving unit 510 may be further configured for: receiving the third-party multimedia playlist sent by a user.

In some optional modes of implementing this embodiment, the apparatus for generating to-be-played multimedia content according to the disclosure may further include an updating unit (not shown in the figure). The updating unit may be configured for: filtering and/or ordering, after the determination unit determines to-be-played multimedia content matching the multimedia contents in the third-party multimedia playlist from a multimedia content database based on the identifier information of the multimedia contents in the third-party multimedia playlist to generate a to-be-played multimedia content list, the to-be-played multimedia content in the to-be-played multimedia content list based on a historical operation behavior of the user.

Below referring to FIG. 6, a structural diagram of a computer system 600 of a server applicable for implementing the embodiments of the disclosure is shown. The server shown in FIG. 6 is only an example, and shall not limit the functions and serviceable range of the embodiments of the disclosure in any way.

Figure 6:
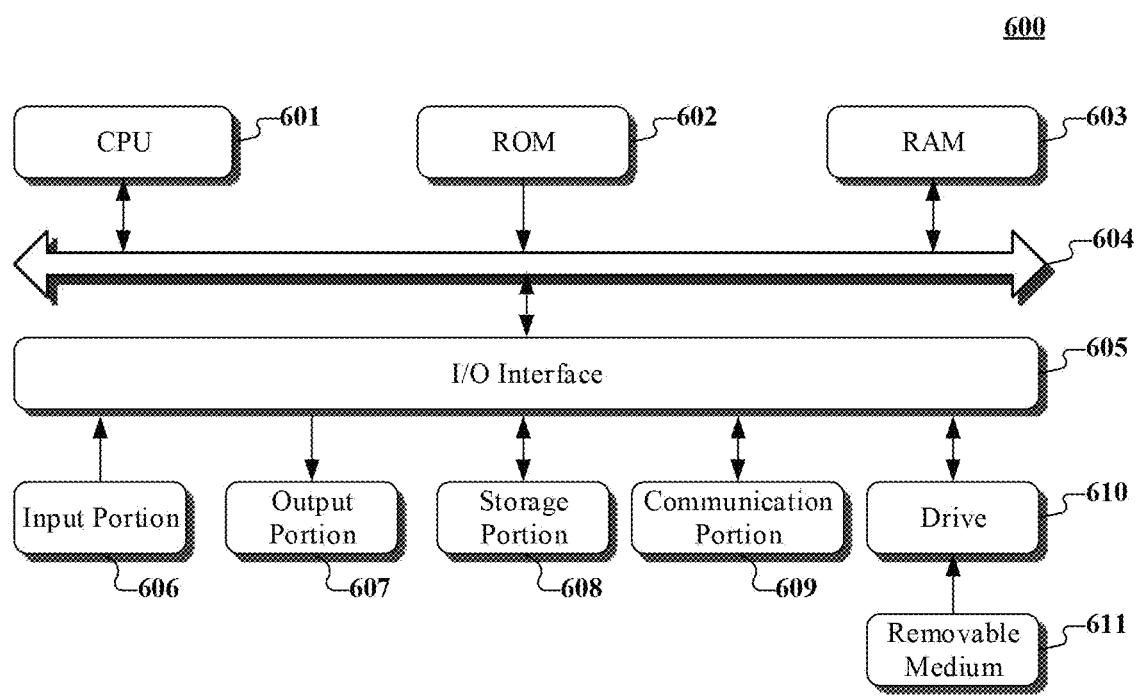
FIG. 6 is a structural schematic diagram of a computer system of a server applicable for implementing the embodiments of the disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A drive 610 is also connected to the I/O interface 605 as required. A removable medium 611, such as a magnetic disk, an optical disk, a magneto-optical disk, and a semiconductor memory, may be installed on the drive 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flowcharts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a receiving unit, an analysis unit, a determination unit, and a sending unit, where the names of these units or modules do not in some cases constitute a limitation to such units or modules themselves. For example, the receiving unit may also be described as "a unit for receiving a third-party multimedia playlist."

In another aspect, the present application further provides a non-volatile computer-readable storage medium. The non-volatile computer-readable storage medium may be the non-volatile computer-readable storage medium included in the apparatus in the above described embodiments, or a stand-alone non-volatile computer-readable storage medium not assembled into the apparatus. The non-volatile computer-readable storage medium stores one or more programs. The one or more programs, when executed by a device, cause the device to: receive a third-party multimedia playlist, the third-party multimedia playlist being from a third-party multimedia playing platform; analyze the third-party multimedia playlist to obtain identifier information of multimedia contents in the third-party multimedia playlist; determine to-be-played multimedia content matching the multimedia contents in the third-party multimedia playlist from a multimedia content database based on the identifier information of the multimedia contents in the third-party multimedia playlist to generate a to-be-played multimedia content list; and send the to-be-played multimedia content list to a terminal playing device.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for generating to-be-played multimedia content, the method comprising:
   receiving a third-party multimedia playlist, the third-party multimedia playlist being from a third-party multimedia playing platform;
   analyzing the third-party multimedia playlist to obtain identifier information of multimedia contents in the third-party multimedia playlist;
   determining to-be-played multimedia content, matching the multimedia contents in the third-party multimedia playlist, from a multimedia content database based on multimedia content items in the multimedia content database, the matching determined responsive to a similarity between the identifier information of the multimedia contents in the third-party multimedia playlist and multimedia content items in the multimedia content database satisfying a preset similarity threshold, the similarity determined based on a weighted combination of a match between a performance style tag of the multimedia content items in the multimedia content database and a performance style tag of the multimedia contents in the third-party multimedia playlist and a match between a leading author tag of multimedia content items in the multimedia content database and a leading author tag of the multimedia contents in the third-party multimedia playlist;
   generating a to-be-played multimedia content list the includes the to-be-played multimedia content;
   ranking multimedia content items in the to-be-played multimedia content list by assigning a higher ranking to a first multimedia content item for which a user indicated preference in the third-party multimedia playlist and assigning a lower ranking to a second multimedia content item for which the user indicated lack of preference in the third-party multimedia playlist; and
   sending the to-be-played multimedia content list to a terminal playing device,
   wherein the method is performed by at least one processor.

2. The method according to claim 1, wherein the determining to-be-played multimedia content comprises:
   determining to-be-played multimedia content identical to the multimedia contents in the third-party multimedia playlist from the multimedia content database based on the identifier information of the multimedia contents in the third-party multimedia playlist.

3. The method according to claim 1, wherein the to-be-played multimedia content list further comprises identifier information of the third-party multimedia playing platform; and the sending the to-be-played multimedia content list to a terminal playing device comprises:
sending the to-be-played multimedia content list to the terminal playing device, to enable the terminal playing device to play, before playing the to-be-played multimedia content in the to-be-played multimedia content list, the identifier information of the third-party multimedia playing platform.

4. The method according to claim 1, wherein the weighted combination further comprises:
number of co-occurrences of the multimedia content items in the multimedia content database and the multimedia contents in the third-party multimedia playlist in a historical playlist.

5. The method according to claim 1, wherein the receiving a third-party multimedia playlist comprises:
receiving the third-party multimedia playlist sent by the user.

6. An apparatus for generating to-be-played multimedia content, the apparatus comprising:
at least one processor; and
a memory storing instructions, the instructions when executed by the at least one processor, cause the at least one processor to perform operations, the operations comprising:
receiving a third-party multimedia playlist, the third-party multimedia playlist being from a third-party multimedia playing platform;
analyzing the third-party multimedia playlist to obtain identifier information of multimedia contents in the third-party multimedia playlist;
determining to-be-played multimedia content, matching the multimedia contents in the third-party multimedia playlist, from a multimedia content database based on multimedia content items in the multimedia content database, the matching determined responsive to a similarity between the identifier information of the multimedia contents in the third-party multimedia playlist and multimedia content items in the multimedia content database satisfying a preset similarity threshold, the similarity determined based on a weighted combination of a match between a performance style tag of the multimedia content items in the multimedia content database and a performance style tag of the multimedia contents in the third-party multimedia playlist and a match between a leading author tag of multimedia content items in the multimedia content database and a leading author tag of the multimedia contents in the third-party multimedia playlist;
generating a to-be-played multimedia content list that includes the to-be-played multimedia content;
ranking multimedia content items in the to-be-played multimedia content list by assigning a higher ranking to a first multimedia content item for which a user indicated preference in the third-party multimedia playlist assigning a lower ranking to a second multimedia content item for which the user indicated lack of preference in the third-party multimedia playlist; and
sending the to-be-played multimedia content list to a terminal playing device.

7. The apparatus according to claim 6, wherein the determining to-be-played multimedia content comprises:
determining to-be-played multimedia content identical to the multimedia contents in the third-party multimedia playlist from the multimedia content database based on the identifier information of the multimedia contents in the third-party multimedia playlist.

8. The apparatus according to claim 6, wherein the to-be-played multimedia content list further comprises identifier information of the third-party multimedia playing platform; and
the sending the to-be-played multimedia content list to a terminal playing device comprises:
sending the to-be-played multimedia content list to the terminal playing device, to enable the terminal playing device to play, before playing the to-be-played multimedia content in the to-be-played multimedia content list, the identifier information of the third-party multimedia playing platform.

9. The apparatus according to claim 6, wherein the weighted combination further comprises:
a number of co-occurrences of the multimedia content items in the multimedia content database and the multimedia contents in the third-party multimedia playlist in a historical playlist.

10. The apparatus according to claim 6, wherein the receiving a third-party multimedia playlist comprises:
receiving the third-party multimedia playlist sent by the user.

11. A non-transitory computer storage medium storing a computer program, the computer program when executed by one or more processors, causes the one or more processors to perform operations, the operations comprising:
receiving a third-party multimedia playlist, the third-party multimedia playlist being from a third-party multimedia playing platform;
analyzing the third-party multimedia playlist to obtain identifier information of multimedia contents in the third-party multimedia playlist;
determining to-be-played multimedia content, matching the multimedia contents in the third-party multimedia playlist, from a multimedia content database based on multimedia content items in the multimedia content database, the matching determined responsive to a similarity between the identifier information of the multimedia contents in the third-party multimedia playlist and multimedia content items in the multimedia content database satisfying a preset similarity threshold, the similarity determined based on a weighted combination of a match between a performance style tag of the multimedia content items in the multimedia content database and a performance style tag of the multimedia contents in the third-party multimedia playlist and a match between a leading author tag of multimedia content items in the multimedia content database and a leading author tag of the multimedia contents in the third-party multimedia playlist;
generating a to-be-played multimedia content list that includes the to-be-played multimedia content;
ranking multimedia content items in the to-be-played multimedia content list by assigning a higher ranking to a first multimedia content item for which a user indicated preference in the third-party multimedia playlist and assigning a lower ranking to a second multimedia content item for which the user indicated lack of preference in the third-party multimedia playlist; and
sending the to-be-played multimedia content list to a terminal playing device.

12. The computer storage medium according to claim 11, wherein the determining to-be-played multimedia content comprises:
determining to-be-played multimedia content identical to the multimedia contents in the third-party multimedia playlist from the multimedia content database based on the identifier information of the multimedia contents in the third-party multimedia playlist.

13. The computer storage medium according to claim 11, wherein the to-be-played multimedia content list further comprises identifier information of the third-party multimedia playing platform; and the sending the to-be-played multimedia content list to a terminal playing device comprises:

sending the to-be-played multimedia content list to the terminal playing device, to enable the terminal playing device to play, before playing the to-be-played multimedia content in the to-be-played multimedia content list, the identifier information of the third-party multimedia playing platform.

14. The computer storage medium according to claim 11, wherein the weighted combination further comprises:

a number of co-occurrences of the multimedia content items in the multimedia content database and the multimedia contents in the third-party multimedia playlist in a historical playlist.

15. The computer storage medium according to claim 11, wherein the receiving a third-party multimedia playlist comprises; receiving the third-party multimedia playlist sent by the user.

* * * * *

UNITED STATES PATENT AND TRADEMARK OFFICE
CERTIFICATE OF CORRECTION

PATENT NO. : 10,936,645 B2  
APPLICATION NO. : 15/858147  
DATED : March 2, 2021  
INVENTOR(S) : Guang Lu et al.

Page 1 of 1

It is certified that error appears in the above-identified patent and that said Letters Patent is hereby corrected as shown below:

In the Specification

In Column 8, Line 39, delete "platform." and insert --platform--.

In Column 12, Line 29, delete "flowcharts" and insert --flow charts--.

In Column 12, Line 35, delete "flowcharts" and insert --flow charts--.

In the Claims

In Column 14, Line 44, Claim 1, delete "the" and insert --that--.

In Column 15, Line 55, Claim 6, delete "playlist" and insert --playlist and--.

In Column 17, Lines 22-23, Claim 15, delete "comprises;" and insert --comprises:--.

Signed and Sealed this  
First Day of June, 2021

Drew Hirshfeld  
*Performing the Functions and Duties of the  
Under Secretary of Commerce for Intellectual Property and  
Director of the United States Patent and Trademark Office*